3,655,747
PROCESS FOR THE MANUFACTURE OF CARBOXYLIC ACIDS

Kurt Sennewald and Wilhelm Vogt, Knapsack, near Cologne, Heinz Erpenbach, Surth, near Cologne, and Hermann Glaser, Knapsack, near Cologne, Germany, assignors to Knapsack Aktiengesellschaft, Knapsack, near Cologne, Germany
No Drawing. Filed Mar. 22, 1968, Ser. No. 715,146
Claims priority, application Germany, Apr. 1, 1967, K 61,875
Int. Cl. C07c 51/26
U.S. Cl. 260—530 R          12 Claims

ABSTRACT OF THE DISCLOSURE

Carboxylic acids are produced by oxidation of aliphatic aldehydes with oxygen or an oxygen-containing gas mixture in the gas phase in contact with a catalyst by oxidizing an aliphatic aldehyde containing from 2 to 6 carbon atoms at elevated temperatures in the presence of a carrier catalyst containing metallic palladium and/or palladium oxide and/or a palladium salt and at least one further substance comprising platinum, rhodium, ruthenium, iridium, copper, silver, gold, zinc, cadmium, tin, lead, bismuth, chromium, molybdenum, tungsten, manganese, iron, cobalt, nickel or tellurium in metallic form or in oxide or salt form, and/or an alkali metal or alkaline earth metal compound as an activator.

---

The present invention relates to a process for the manufacture of carboxylic acids by oxidation of aliphatic aldehydes with oxygen or an oxygen-containing gas mixture in the gas phase in contact with a catalyst.

It is known that acetic acid can be produced by the oxidation of acetaldehyde using various processes known for some time, which are most frequently carried out in the liquid phase and sometimes are carried out in the gas phase. However, only the liquid-phase processes in various modifications have been used since years for the commercial production of acetic acid. A particular advantage associated with the liquid-phase processes is seen to reside in the accurate temperature control, which is a result of the high heat transfer coefficients in the liquid phase. A disadvantage associated with the liquid-phase processes resides in the fact that the reaction heat evolved at a low temperature range between about 50 and 70° C., which must be dissipated by means of a coolant, cannot be utilized.

It has now been found that good yields of acetic acid can be obtained by oxidation of acetaldehyde at elevated temperature, preferably at temperatures between 120 and 250° C., given that a gas mixture comprising acetaldehyde and oxygen, which can be used, if desired, in combination with one or more inert gases or a further vaporized organic material, is conveyed over a catalyst containing metallic palladium and/or palladium oxide or a palladium salt, such as palladium acetate, as its active component deposited on an inert carrier comprising, for example silicic acid ($SiO_2$), bentonite, aluminum oxide, asbestos, pumice or active carbon. The efficiency of the catalyst can be improved and this should be conveniently done by using it in further combination with one or more additives such as platinum, rhodium, ruthenium, iridium, copper, silver, gold, zinc, cadmium, tin, lead, bismuth, chromium, molybdenum, tungsten, manganese, iron, cobalt, nickel or tellurium, which can be employed in metallic form or in oxide or salt form, and in still further combination with one or more alkali metal or alkaline earth metal salts. The reaction can be carried out within a wide pressure range of between about 1 and 20 atmospheres absolute, but preference will be given to the range of between 2 and 10 atmospheres absolute for reasons of economy. Inert gases or vaporized organic materials, which are substantially inert under the reaction conditions, can be added in order thereby to keep the oxygen concentration in the starting mixture outside the limits of explosion. The inert gases of interest include nitrogen and more particularly carbon dioxide, which is obtained as a by-product and, in the cycled process, can be made to appear substantially in any concentration in the issuing gas by appropriate control of the quantity of that gas. The vaporizable organic substances, which are substantially inert under the reaction conditions and are useful for desensitization, include primarily acetic acid and aliphatic hydrocarbons.

The process can be carried out without the addition of a desensitizing gas, given that acetaldehyde in vapor form and oxygen are mixed with one another in a ratio which ensures that the oxygen content in the gas mixture does not exceed 9% by volume, which means that the gas mixture is outside the limits of explosion. In this case, however, as a result of the large stoichiometric excess of acetaldehyde over the oxygen, some slight side-reaction is liable to occur by the disintegration of acetaldehyde into methane and carbon monoxide. Air should be conveniently used as the oxidizing agent when the process is carried out as a single passage reaction. The reason is that the nitrogen included in the air acts as a diluent. Steam can also be used as an inert diluent; in this case, however, the resulting acetic acid, which is produced after cooling of the reaction gas, is obtained in the form of an aqueous solution, and rather considerable technical expenditure is necessary to separate the water.

In carryng out the reaction, the gas mixture, which contains between 2 and up to about 90% by volume acetaldehyde in vapor form and may contain inert additives as well as up to 9% by volume oxygen—this is determined by the limit of explosion under these conditions—is conveyed through a tubular stainless steel reactor charged with the catalyst. The catalyst is used in the form of particles having a size between 3 and 6 mm. The tubular stainless steel reactor has inserted sensitive elements, which are used for temperature control, and is gently heated from the outside by means of a compressed water jacket. The dimensions of the tubular reactor are preferably so selected that the operating conditions result in a velocity of flow for the gas mixture between 50 and 100 cm./second. This ensures high heat transfer coefficients at the gas side. The reaction products are condensed out by subjecting the gas mixture to cooling. When the process is cycled, it is sufficient, at a temperature value which depends on the gas concentration, to condense out no more than the resulting acetic acid, whilst the acetaldehyde in excess, which is first allowed to remain in the reaction gas, is recycled later to the reactor, after admixture of fresh oxygen and acetaldehyde. For the quantitative recovery of the unreacted acetaldehyde in a single passage reaction, it is necessary to use substantially lower condensation temperatures or to subject the reaction products later to scrubbing.

The particular advantage associated with the present process resides in the fact that the reaction heat evolved at reaction temperatures between 120 and 250° C., preferably between 150 and 210° C., can be very readily transformed in a technical process into useful steam by means of the compressed water jacket. The present gas-phase process is also of interest in those cases in which the acetaldehyde to undergo reaction is obtained in gas form in a preliminary process step, or in which the acetic acid produced must be in gas form for use in a later process step.

The catalysts for use in the present process are produced by impregnating the inert catalyst carrier, for example silicic acid, with a solution, e.g. of palladium acetate and potassium acetate in water, and then drying the catalyst carrier so impregnated. Needless to say it is possible simultaneously to add acetates of one or more further activating elements, such as referred to hereinabove, provided that such acetates do actually exist, and precipitate them jointly with the palladium acetate on the carrier.

Another typical mode of operation comprises impregnating the inert carrier with an aqueous solution of $PdCl_2$ and $AuCl_3$ in weak hydrochloric acid and evaporating the impregnated carrier to dryness. The noble metal chlorides precipitated on the catalyst are reduced by introducing the carrier into a 5% aqueous hydrazine solution. The carrier is carefully washed with water and the whole is concentrated by evaporation with permanent agitation, while adding a potassium or zinc acetate solution. The catalyst so made is found to contain the active component and the activator (with the exception of potassium or zinc acetate) in metallic form.

In another mode of preparing the catalyst, the carrier treated in the manner described above, which already contains metallic Pd and Au but no potassium acetate, is calcined at 600° C. with the access of air, whereby the Pd is transformed into PdO. The carrier so treated is impregnated later, for example, with a potassium acetate solution and is then ready for use.

In preparing the catalyst, the individual components should be used in proportions that ensure that the dried catalysts contain between 0.1 and 10% by weight of Pd, preferably between 0.5 and 3% by weight of Pd, and up to 10% by weight of activating substance.

Needless to say the process of the present invention is not limited to the production of acetic acid by the oxidation of acetaldehyde. Further aliphatic aldehydes containing from 3 to 6 carbon atoms, such as propionaldehyde, n-utyraldehyde, isobutyraldehyde or isovaleraldehyde, can also be oxidized to obtain the corresponding carboxylic acids. The reaction is carried out under analogous conditions, except the removal of the reaction products from the reaction gas mixture by condensation. This is naturally possible at a higher temperature range.

The present invention relates more particularly to a process for the production of carboxylic acids by oxidation of aliphatic aldehydes by means of oxygen or an oxygen-containing gas mixture in the gas phase and in contact with a catalyst, which comprises oxidizing aliphatic aldehydes containing from 2 to 6 carbon atoms at elevated temperatures in the presence of a carrier catalyst containing metallic palladium and/or palladium oxide and/or palladium salts and at least one further substance consisting of platinum, rhodium, ruthenium, iridium, copper, silver, gold, zinc, cadmium, tin, lead, bismuth, chromium, molybdenum, tungsten, manganese, iron, cobalt, nickel or tellurium, which can be used in metallic form or in oxide or salt form, and/or one or more alkali metal or alkaline earth metal compounds as activators.

The carrier catalyst contains as the alkali metal or alkaline earth metal compounds, for example the carboxylates, preferably the formates and acetates, or the hydroxides, carbonates, nitrites or phosphates.

The carrier catalyst preferably contains between about 0.1 and 10% by weight Pd, advantageously between 0.5 and 3% by weight Pd in metallic form or in oxide and/or salt form, and between 0.01 and 10% by weight, preferably between 0.1 and 10% by weight of an activator.

The carrier materials include, for example, silicic acid ($SiO_2$), kieselguhr, silica gel, diatomaceous earth, aluminum oxide, aluminum silicate, aluminum phosphate, bentonite, pumice, silicon carbide, asbestos or active carbon.

The oxidation is preferably carried out at temperatures between 120 and 250° C., preferably between 150 and 210° C. and under pressures between 1 and 20 atmospheres absolute, preferably between 2 and 10 atmospheres absolute.

The aldehyde can be used in admixture with an inert gas, which is preferably nitrogen or carbon dioxide, or with an organic compound in vapor form, which is inert under the operating conditions and preferably is an aliphatic hydrocarbon or the aliphatic carboxylic acid to be produced, as a diluent or desensitizing agent.

The gas mixture generally used contains between 2 and up to about 90% by volume of aldehyde in vapor form, at most 9% by volume oxygen and, if desired, a diluent.

EXAMPLE 1

1 kg. ball-shaped (balls 4 mm. wide) silicic acid of commercial quality with an apparent density of 0.5 kg./liter and a BET-surface area of about 120 square meters per gram, was mixed, with agitation, with a solution of 14 grams $PdCl_2 \cdot 2H_2O$, 6.3 grams $HAuCl_4 \cdot 4H_2O$ and 10 cc. concentrated hydrochloric acid in 1.5 liters water. The liquid was evaporated with permanent agitation and the whole was dried in a vacuum drying cabinet, at about 60° C. The dry mass was slowly introduced into 2 liters of a 5% hydrazine hydrate solution, at 40° C., the metal salts being reduced instantaneously. The solution was allowed to act on the mass for a period of 15 minutes, the hydrazine hydrate solution was decanted and the whole was washed for about 5 hours with flowing tap water. While still moist, the mass was mixed with a saturated solution of 100 grams potassium acetate in water and evaporated to dryness, again with agitation. After having been dried again in a vacuum drying cabinet at about 60° C., the carrier catalyst was ready for use. It contained 0.7% by weight Pd, 0.3% by weight Au and 4% by weight K in the form of potassium acetate.

2 liters of the carrier catalyst so made were placed in a reactor comprising 2 series-connected chrome-nickel steel tubes (internal diameter: 20 mm.), each tube having a length of 3 meters. The temperature prevailing inside the reaction tubes was controlled by means of temperature-sensitive elements. The tubes were surrounded by compressed water jackets intended for the dissipation of heat.

The reactor was charged at 170° C. and under a pressure of 6 atmospheres absolute, with 2660 normal liters/hr. of a gas mixture comprising 20% by volume acetaldehyde, 7% by volume oxygen and 73% by volume $CO_2$.

The reaction gas was cooled to −70° C. in order substantially to isolate the reaction products. There were obtained, per hour, 1160 grams of a reaction mixture consisting of 44.3% by weight (=514 grams) acetic acid, 1% by weight water, the balance being unreacted acetaldehyde. By single passage through the reactor there was transformed 39.2% of the acetaldehyde and 74% of the oxygen used. The yield of acetic acid was 92%, referred to the acetaldehyde reacted.

EXAMPLE 2

1 kg. γ-aluminum oxide with an apparent density of 0.9 kg. per liter was mixed, with agitation, with a solution of 32 grams palladium acetate and 100 grams potassium acetate in 1 liter of water, and the whole was evaporated to dryness. Drying was continued in a vacuum drying cabinet at about 60° C. The catalyst which was then ready for use contained 1.5% by weight Pd and 4% by weight potassium, both elements in the form of their acetates.

2 liters of the carrier catalyst so made were introduced into the apparatus described in Example 1. 1045 grams acetaldehyde and 5200 grams acetic acid in vapor form as a diluent were conveyed in combination with 186 normal liters oxygen over the catalyst per hour, at 185° C. and under a pressure of 6 atmospheres absolute. Near the reactor outlet, the reaction gas mixture was mixed, for reasons of security, with 300 normal liters/hr. nitrogen to reduce the concentration of the oxygen near the end of the apparatus to less than 8% by volume. Condensation resulted in the formation of 6360 grams/hr. of a mixture comprising 9.9% by weight acetaldehyde, 0.6% water and 89.5% acetic acid; this means in other words that a further 500 grams/hr. acetic acid originated from the oxidation of the acetaldehyde.

39.9% of the acetaldehyde put through and 84% of the oxygen were found to have undergone conversion. The acetic acid yield was calculated to be 88%, referred to the acetaldehyde reacted.

EXAMPLE 3

A catalyst mass which had been produced in the manner described in Example 1 by impregnation of the carrier with $PdCl_2$ and $HAuCl_4$ followed by reduction with hydrazine hydrate, was dried and calcined for 1 hour at 600° C. with the access of air before it was impregnated further with potassium acetate. The Pd was transformed into PdO. The cold mass was mixed with a solution of 100 grams potassium acetate in 1.5 liters water, and the water was evaporated with agitation. After having been dried in a vacuum drying cabinet at 60° C., the carrier catalyst was ready for use.

The catalyst so made was used under the conditions described in Example 2 and produced a 85% yield of acetic acid, referred to the acetaldehyde transformed.

EXAMPLE 4

1 kg. of the $SiO_2$-carrier was mixed, in the manner described in Example 1, with a solution of 15 grams $Pd(CH_3COO)_2 \cdot 2H_2O$ in 1.5 liters water and evaporated with agitation. Into the dried mass there was introduced, with thorough agitation, a solution of 4 grams potassium aurate (calculated as $KAuO_2$) and 70 grams $K_2CO_3$, the whole was evaporated to dryness and thereafter dried in a vacuum cabinet. The catalyst was then ready for use and contained 0.7% by weight Pd, 0.3% by weight Au and 4% potassium in the form of their salts.

The catalyst so made was used under the conditions described in Example 2 and produced a 93% acetic acid yield, referred to the acetaldehyde transformed.

EXAMPLE 5

A mixture of 870 grams propionaldehyde in vapor form, 1750 normal liters $CO_2$ and 157 normal liters $O_2$ was passed, per hour, at 170° C. under a pressure of 6 atmospheres absolute and under the conditions set forth in Example 1, over the carrier catalyst. The reaction gas mixture was cooled and there were obtained 920 grams/hr. of a condensate containing 27.4% by weight (=252 grams) propionic acid, 2.8% by weight water and 69.8% by weight unreacted propionaldehyde. By single passage through the reactor there was transformed 26.3% of the propionaldehyde and 80% of the oxygen. Propionic acid was obtained in a yield of 86%, referred to the propionaledehyde transformed.

EXAMPLE 6

The reactor described in Example 1 was charged with 2 liters of a catalyst, which had been prepared in the manner set forth in Example 1, save that it had been impregnated with 168 grams zinc acetate rather than with 100 grams potassium acetate per kg. of catalyst. A gas mixture of 208 normal liters oxygen, 832 normal liters nitrogen and 1560 normal liters (=3060 grams) acetaldehyde was passed, per hour, at 170° C. and under a pressure of 6 atmospheres absolute, over the catalyst. The reaction gas was cooled. Under the operating conditions there condensed per hour 3220 grams of a reaction product containing 78.6% by weight acetaldehyde, 20.2% by weight acetic acid and 1.2% by weight water. 650 grams acetic acid were found to have formed per hour. Acetic acid was obtained in a yield of 91%, referred to the acetaldehyde reacted. The acetaldehyde conversion rate for a single passage reaction was found to be 17.2%, and the oxygen conversion rate was found to be 87.5%.

What is claimed is:

1. A process for the production of carboxylic acids by oxidation of aliphatic aldehydes with oxygen or an oxygen-containing gas mixture in the gas phase in contact with a catalyst, which comprises oxidizing an aliphatic aldehyde containing from 2 to 6 carbon atoms at elevated temperatures in the presence of a catalyst consisting essentially of at least one member selected from the group consisting of metallic palladium, palladium oxide and palladium salts and at least one further substance selected from the group consisting of gold and zinc, in metallic form or in oxide or salt form, and an alkali metal or alkaline earth metal compound as activators on an inert carrier.

2. The process of claim 1, wherein the alkali metal or alkaline earth metal compound contained in the carrier catalyst is a member selected from the group consisting of carboxylates, hydroxides, carbonates, nitrites and phosphates.

3. The process of claim 2, wherein the alkali metal and alkaline earth metal carboxylates are the formiates.

4. The process of claim 2, wherein the alkali metal and alkaline earth metal carboxylates are the acetates.

5. The process of claim 1, wherein the catalyst contains between 0.1 and 10% by weight palladium in metallic form or oxide or salt form and between 0.01 and 10% by weight of at least one activator.

6. The process of claim 5, wherein the catalyst contains between 0.5 and 3% by weight palladium in metallic form or oxide or salt form.

7. The process of claim 5, wherein the catalyst contains the activator in a proportion between 0.1 and 10% by weight.

8. The process of claim 1, wherein the catalyst carrier is at least one member selected from the group consisting of silicic acid ($SiO_2$), kieselguhr, silica gel, diatomaceous earth, aluminum oxide, aluminum silicate, aluminum phosphate, bentonite, pumice, silicon carbide, asbestos and active carbon.

9. The process of claim 1, wherein the oxidation is carried out at temperatures between 120 and 250° C., and under pressures between 1 and 20 atmospheres absolute.

10. The process of claim 9, wherein the oxidation is carried out at temperatures between 150 and 210° C. and under pressures between 2 and 10 atmospheres absolute.

11. The process of claim 1, wherein the gas mixture to undergo reaction contains between 2 and up to about 90% by volume aldehyde in vapor form and at most 9% by volume oxygen.

12. The process of claim 1, wherein the aldehyde is oxidized in admixture with at least one member selected from the group consisting of carbon dioxide, nitrogen, an aliphatic hydrocarbon and the aliphatic carboxylic acid to be produced.

References Cited

UNITED STATES PATENTS

| | | | |
|---|---|---|---|
| 3,106,579 | 10/1963 | Hörnig et al. | 260—530 |
| 3,450,748 | 6/1969 | Schaeffer | 260—530 |
| 1,286,256 | 12/1918 | Dreyfus | 260—530 |
| Re. 17,377 | 7/1929 | Matheson | 260—530 |
| 1,851,664 | 3/1932 | Dreyfus | 260—530 |
| 2,959,613 | 11/1960 | Whitfield | 260—530 |

OTHER REFERENCES

Vogel, Practical Organic Chemistry, 3rd ed., 1956, pp 947–8.

JAMES A. PATTEN, Primary Examiner

R. S. WEISSBERG, Assistant Examiner

U.S. Cl. X.R.

252—470, 471, 472, 473, 474